Oct. 1, 1968

C. BOWNESS 3,404,352

MIRROR-SUPPORTING STRUCTURE FOR LASERS

Filed Feb. 8, 1965

INVENTOR
COLIN BOWNESS

BY *[signature]*

AGENT

United States Patent Office 3,404,352
Patented Oct. 1, 1968

3,404,352
MIRROR-SUPPORTING STRUCTURE FOR LASERS
Colin Bowness, Weston, Mass., assignor to Raytheon Company, Lexington, Mass., a corporation of Delaware
Filed Feb. 8, 1965, Ser. No. 430,939
9 Claims. (Cl. 331—94.5)

This invention relates to laser structures and has particular reference to devices for providing angular adjustment of laser mirrors.

In the operation of lasers it is extremely important that the positions of the laser mirrors, that is those mirrors which form the resonant optical cavity, be precisely adjusted so that, in the case of flat mirrors, they be maintained effectively parallel and, in the case of spherical mirrors, their radii of curvature are aligned to within seconds of arc.

Prior art laser structures employed various relatively unsatisfactory means for adjusting the mirrors, such as helical spring devices and differential screws. However, such means were generally extremely sensitive to mechanical vibration, relatively expensive to fabricate, difficult to critically and accurately adjust, and impossible to modify as to sensitivity. Further, particularly the spring devices, they inherently possessed undesirable resonance which occurred when the devices were subjected to mechanical shock or vibration, and exhibited undesirable backlash.

In accordance with this invention, there has been provided a novel and efficient mirror supporting and adjusting structure which is relatively insensitive to mechanical vibration or shock, simple and inexpensive to construct and operate, and readily adaptable to modification whenever it is desired to alter the adjustment sensitivity. These beneficial objectives are achieved by the provision of a laser structure having a mirror at each end of the resonant cavity, with at least one mirror being mounted upon a flat plate or disc which is supported on a fixed frame by one or more adjusting devices constructed in accordance with this invention. Each adjusting device comprises a headed adjusting screw which extends through the mirror-supporting disc and is threadedly mounted in the frame, with a series of thin rubber washer-like elements being mounted on the screw on either side of the disc. In accordance with this invention, it has been found that the number of such elements located between the disc and frame should be small compared with the number located on the opposite side of the disc. However, the actual number of elements employed may be readily changed to change the ratio in accordance with the sensitivity desired.

Devices of this character provide efficient and controlled damping without exhibiting undesirable natural resonances.

Other advantages of this invention will become apparent from the following description taken in connection with the accompanying drawing, wherein.

Referring more particularly to the drawing, wherein like characters of reference designate like parts throughout the several views, the laser structure of FIG. 1 is depicted pictorially and is not shown in great detail except insofar as the mirror mounting and adjusting device is concerned.

Figure 1:
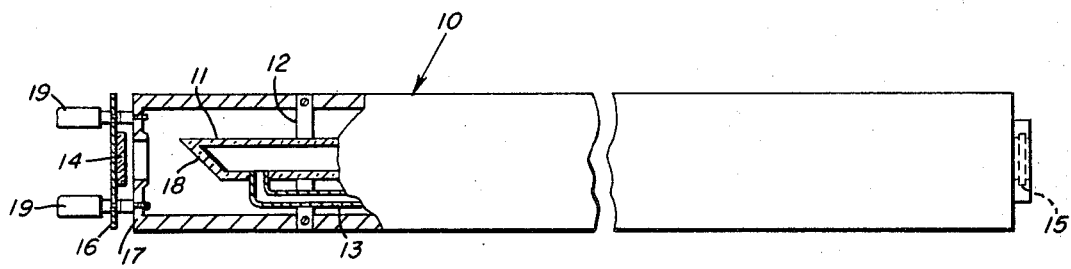
FIG. 1 is a side elevational view of a laser device embodying the invention with a portion of the enclosure removed.

Briefly, the laser is shown as being of the commonly known gas-filled type located within a suitable enclosure 10, although it should be understood that the invention may be used with other lasering devices such as those employing crystals or liquids as the radiation producing materials. Within the enclosure is a hollow glass discharge tube 11 supported on the frame of the enclosure by brackets 12 and filled with a selected combination of gases such as a mixture of helium and neon. The gas mixture is adapted to be pumped or activated by suitable R.F., DC or other pumping means. Such pumping means is well known in the art, and, consequently, is not described in detail herein since it does not in itself form a part of the present invention. For information pertaining to R.F. pumping of gas lasers and the resultant production of coherent radiation, reference is made to page 80 et seq. of "Lasers," by Bela A. Lengyel, published in 1962 by John Wiley & Sons, Inc., Library of Congress Catalog Card Number 63–9430.

The present discharge tube 11 is adapted particularly to be pumped by DC discharge between two electrodes (not shown) adjacent the tube 11 and connected with the interior thereof at the ends as by communicating tubulations 13.

For the present description it is sufficient to state that pumping produces collision between the atoms of the gases, which causes population inversion between two different energy levels, such transition producing electromagnetic radiation which bounces back and forth between mirrors 14 and 15 located at opposite ends of the device. The mirrors are adapted to reflect radiation falling upon them back into the gas mixture so that self-oscillation occurs. One mirror is made wholly reflective while the other is made partially reflective. Thus, an output beam of coherent electromagnetic radiation is permitted to escape through the partially reflective mirror.

The mirrors 14 and 15 may be constructed in any suitable manner such as by providing quartz discs with dielectric reflective coatings on their inner surfaces. The mirrors may be flat and, consequently, should be maintained in plane parallel relationship, or they may be spherical confocal mirrors in which case it is important that they be adjusted so that their radii of curvature are properly aligned to within seconds of arc. The mirrors 14–15 shown in FIG. 1 are flat, with mirror 15 being suitably fixed to one end of the frame 10 while mirror 14 is adjustably mounted on the opposite end of the frame. Although only one mirror is shown and described herein as being adjustable, it is understood that both may be adjustable if desired.

Mirror 14 is cemented or otherwise suitably affixed to a supporting plate or disc 16 which is positioned substantially parallel to the adjacent end wall 17 of the enclosure 10. The assembly is so located that radiation emitted from the adjacent end 18 of the discharge tube 11 will pass to mirror 14 through an opening in end wall 17.

Figure 2:
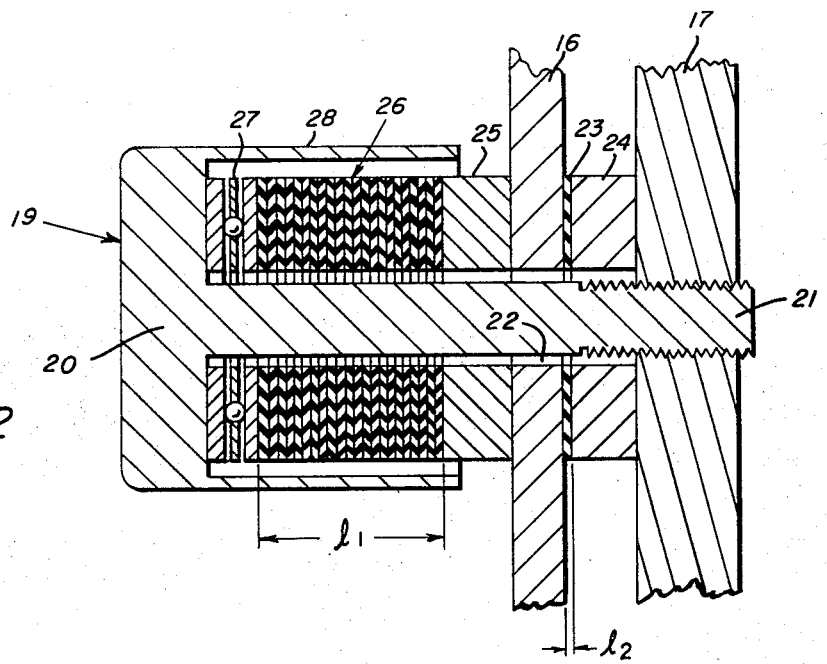
FIG. 2 is an enlarged axial sectional view of the adjusting means.
Figure 3:
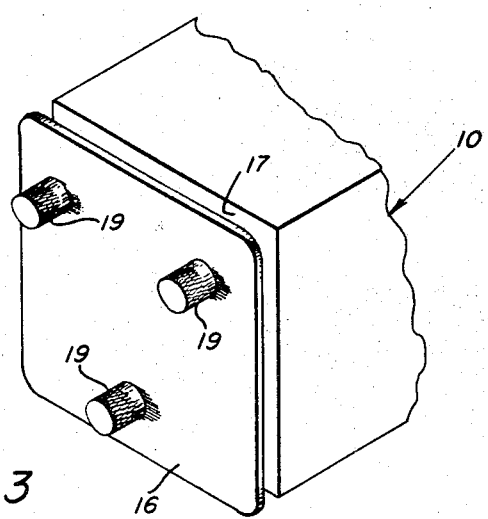
FIG. 3 is an enlarged isometric view of an end portion of the device shown in FIG. 1.

Plate 16 is adjustably mounted on the end wall 17 by means of three adjusting screws 19 (FIG. 3) with the mirror 14 lying substantially at the center of an isosceles triangle formed by the mounts. Referring to FIG. 2, it will be seen that each screw 19 comprises a head portion 20 formed on one end of a shank 21, the other end of the shank being threadedly mounted in the end wall 17. Shank 21 passes through an opening 22 provided therefor in plate 16. Between plate 16 and wall 17 shank 21 carries a pair of annular spacers 23 and 24. Spacer 24 is preferably a rigid member of metal or the like and may be formed integral with wall 17, if desired, its purpose being primarily to space the plate 16 sufficiently from wall 17 to enable the plate to be moved out of parallelism with the wall without physically engaging the wall.

Spacer 23 is located between plate 16 and spacer 24 and is a very thin washer-like element formed of rubber or the like. The rubber spacer 23 need not be pure rubber but may be any one of that class of elastic materials which exhibits little hysteresis or set. Butyl rubber or neoprene rubber, for example, are both quite satisfactory. The outer peripheral configuration of the rubber spacer is not significantly critical and it may be round, oval, square or rectangular. It may have any desired thickness but preferably is about 1/32" thick.

It will be apparent that plate 16 may be moved toward wall 17 by compression of spacer 23 and that such compression will be controlled by the amount of inherent elasticity or resiliency possessed by the spacer. The nature of the spacer is, further, such that the plate 16 may be angled so that one side will be located closer to wall 17 than an opposite side. Still greater sensitivity may be provided by reducing the thickness of spacer 23.

On the opposite side of plate 16 is located a rigid spacer or collar 25 upon which are stacked a plurality of rubber rings 26, each being preferably but not necessarily identical with spacer 23. At the opposite end of the stack of rings 26 is positioned a bearing 27 upon which rests the inner surface of the screw head 20. The screw illustrated herein is also provided with a skirt 28 which encloses at least a portion of the stack 26 and which is externally knurled so that the screw may be readily manually adjusted.

It will be apparent that as the screw is threaded into wall 17, compression of the rubber spacers in stack 26 will occur, as well as of spacer 23. Although a single block of rubber may be used in place of stack 26, the use of a multiplicity of rubber rings 26 or a number of larger blocks enables the ratio of the mechanism to be changed by simply reassembling with more or fewer rubber spacers between the plate 16 and wall 17. If rings or spacers are formed from 1/32" thick sheet rubber, for example, it is possible to use a complete set of, for example, twenty-one rings with one, two, or even more thereof located between plate 16 and wall 17, and the remaining located between plate 16 and bearing 27. This combination will provide many ratios such as 20:1, 19:2, 6:1, etc.

From the foregoing, it will be apparent that the mirror 14 may be suitably adjusted with respect to a longitudinal axis by proper adjustment of the three screws 19. To a first order approximation, any movement of the screw through a distance $x$ will result in a corresponding movement of the mirror-supporting plate 16 which is $$x \frac{l_2}{l_1}$$

(FIG. 2). Thus, a factor of ten or twenty times reduction in motion is easily obtained. At the same time, the plate 16 remains in relatively close-spaced relation to the frame. This feature makes the device extremely useful in an environment where vibration is present and where extremely efficient damping without natural response resonances is desired. This structure will possess all of the hereinbefore mentioned advantages over helical spring or differential screw devices, which advantages are of extreme importance in laser installations subject to vibrations such as in aircraft, ground vehicles, or the like.

Although a preferred embodiment of the invention has been shown and described, it will be apparent that various modifications and changes may be made by those skilled in the art without departing from the spirit of the invention as expressed in the accompanying claims. For example, it might be desired to position metal spacers between the annular washers in stack 26 to insure uniform distortion or deformation of all washers in the stack when the stack is subjected to compression. This will also insure maintenance of the ratio established by the selected number of washers used despite changes in temperature or pressure. Further, the screw 19 need not penetrate the rubber elements but may be offset therefrom and provided with a transversely extending portion which engages the stack, if desired. Accordingly, all matter shown and described should be considered as illustrative and not in a limiting sense.

I claim:
1. A laser structure comprising:
  a radiation producing medium; and
  reflecting means at each end of said medium forming a resonant cavity for reflecting radiation from said medium back into the cavity;
  said reflecting means at one end of the cavity comprising a mirror positioned in the path of said radiation,
  a rigid member adjacent and spaced from said mirror,
  a plate supporting the mirror and movable therewith toward and away from said rigid member,
  and means for moving said plate and adjusting said mirror with respect to said member comprising
  a screw threadedly mounted in said rigid member and having a pressure-inducing portion thereon,
  a first elastic member between said plate and rigid member,
  and a second elastic member between said plate and pressure-inducing portion of the screw, the screw being adjustable toward and away from the support to vary the compression of the elastic members and thereby the adjustment of said mirror.

2. A device substantially as set forth in claim 1 wherein said first and second elastic elements are of different thicknesses to provide increased sensitivity in the adjustment.

3. A device substantially as set forth in claim 1 wherein one of said elastic elements is relatively thin and the other is relatively thick, the differences in thickness establishing a known thickness ratio of said elements whereby the elements exhibit different compression characteristics.

4. A device substantially as set forth in claim 1 wherein said first elastic element is thin and said second elastic element is a number of times thicker than the first element.

5. A device substantially as set forth in claim 1 wherein said first and second elastic elements are annular, and the screw extends through the annular elements and has a head portion bearing upon the second element.

6. A device substantially as set forth in claim 1 wherein said screw extends longitudinally of the first and second elastic elements and has a head portion bearing upon the second element.

7. A device substantially as set forth in claim 6 wherein a bearing is located between the second elastic element and the head portion of the screw.

8. A device substantially as set forth in claim 6 wherein said first elastic element is a thin disc of rubber, and the second elastic element comprises a stack of thin rubber discs.

9. A device substantially as set forth in claim 8 wherein the number of rubber discs in the stack comprising said second elastic element establishes a known thickness ratio with said first element which determines the difference in compressibility characteristics between said first and second elements.

References Cited

UNITED STATES PATENTS

| | | | |
|---|---|---|---|
| 3,193,237 | 7/1965 | Adams | 248—358 |
| 3,204,471 | 9/1965 | Rempel | 331—94.5 |
| 3,223,374 | 12/1965 | Butler et al. | 248—358 |
| 3,225,307 | 12/1965 | Weissman | 331—94.5 |

JEWELL H. PEDERSEN, *Primary Examiner.*

RONALD L. WIBERT, *Assistant Examiner.*